United States Patent
Krishnamurthy et al.

(10) Patent No.: US 10,556,596 B2
(45) Date of Patent: Feb. 11, 2020

(54) DRIVER SCORING AND SAFE DRIVING NOTIFICATIONS

(71) Applicants: Nissan North America, Inc., Franklin, TN (US); Renault S.A.S., Boulogne-Billancourt (FR)

(72) Inventors: Vikram Krishnamurthy, Palo Alto, CA (US); Mehmet Emre Gursoy, Atlanta, GA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 15/994,865

(22) Filed: May 31, 2018

(65) Prior Publication Data
US 2019/0367037 A1    Dec. 5, 2019

(51) Int. Cl.
*B60W 40/09* (2012.01)
*B60W 50/14* (2012.01)
*G01C 21/34* (2006.01)
*G06N 20/00* (2019.01)

(52) U.S. Cl.
CPC ............ *B60W 40/09* (2013.01); *B60W 50/14* (2013.01); *G01C 21/3484* (2013.01); *G06N 20/00* (2019.01); *B60W 2050/146* (2013.01); *B60W 2520/105* (2013.01); *B60W 2550/308* (2013.01)

(58) Field of Classification Search
CPC ...... B60W 40/09; B60W 50/14; G06N 20/00; G01C 21/3484
USPC ....................................................... 340/576
See application file for complete search history.

(56) References Cited

U.S. PATENT DOCUMENTS

| | | | |
|---|---|---|---|
| 8,812,330 B1 | 8/2014 | Cripe et al. | |
| 9,349,228 B2* | 5/2016 | Ochsendorf | G06Q 10/06393 |
| 9,671,241 B2* | 6/2017 | Tang | G01C 21/3469 |
| 2009/0210257 A1* | 8/2009 | Chalfant | G06Q 40/08 705/4 |
| 2009/0284361 A1* | 11/2009 | Boddie | B60Q 9/008 340/439 |
| 2015/0035666 A1* | 2/2015 | Scofield | G08G 1/0112 340/439 |
| 2017/0057411 A1* | 3/2017 | Heath | B60W 50/0097 |
| 2017/0072850 A1* | 3/2017 | Curtis | B60W 50/0097 |
| 2018/0281757 A1* | 10/2018 | Matsuo | B60T 7/12 |

(Continued)

FOREIGN PATENT DOCUMENTS

WO     2017105331 A1    6/2017

*Primary Examiner* — Omar Casillashernandez
(74) *Attorney, Agent, or Firm* — Young Basile Hanlon & MacFarlane, P.C.

(57) ABSTRACT

A method and apparatus may be used in a vehicle to generate a dynamic driver score. The method may include collecting data. The data may be collected at a predetermined interval. The data may include one or more frames. Each frame may correspond to the predetermined interval and may be divided into segments. Each frame may include a first acceleration data and a second acceleration data. The first acceleration data may be associated with an acceleration of a vehicle at a first segment of the frame, and the second acceleration data may be associated with an acceleration of the vehicle at a second segment of the frame. The frames may be grouped using machine learning methods to determine the driver score. The driver score may be used to modify driving behavior.

19 Claims, 7 Drawing Sheets

(56) References Cited

U.S. PATENT DOCUMENTS

2018/0345981 A1* 12/2018 Ferguson .............. B60W 40/09
2018/0370529 A1* 12/2018 Matsunaga ........... B60W 30/09
2019/0023279 A1*  1/2019 Schacher ............ B60W 50/085

* cited by examiner

3000

| t₁ | t₂ | t₃ | t₄ | t₅ | t₆ |
|---|---|---|---|---|---|
| I₁ | I₂ | I₃ | I₄ | I₅ | |
| LOCATION SPEED ACCELERATION TIMESTAMP | | | | LOCATION SPEED ACCELERATION TIMESTAMP | |

FIG. 3

DRIVER SCORING AND SAFE DRIVING NOTIFICATIONS

TECHNICAL FIELD

This disclosure relates to vehicle operational management and driving.

BACKGROUND

Usage-based insurance (UBI) requires that one-second period data is collected from a vehicle. UBI companies use this collected data to determine a driving score. UBI companies use the driving score to calculate an insurance rate.

Data-based services for a connected vehicle utilize a large amount of data, and UBI data requirements should be sufficiently accommodative to enable all data-based services. Typical data plans allocate from 100 megabytes (MB) to 135 MB per month per vehicle. One second period data typically results in approximately 35 megabytes (MB) per month of data usage. This can result in an overuse of allocated data.

It would be desirable to have a method and apparatus that uses data analytics to reduce the amount of data usage to approximately 7 MB or less per month to allow UBI to coexist with other data-based services and updates. Typical driving scores, also referred to as driver scores, do not provide any meaningful real-time benefit for the driver. Accordingly, it would be desirable to provide real-time information, based on a driver score, to the driver to enhance safety.

SUMMARY

Disclosed herein are aspects, features, elements, implementations, and embodiments of systems and methods for vehicle operational management.

A method may be used in a vehicle to generate a dynamic driver score that can be used in real-time. The method may include collecting data. In some implementations, the collection of data may occur over a period of approximately two months or more to have sufficient data to generate a driver score that is an accurate representation of driving behavior. The data may be collected at a predetermined interval. The data may include one or more frames. Each frame corresponds to the predetermined interval and may be divided into segments. For example, each frame may be of five seconds' duration, with five segments of one second each. Each frame may include a first acceleration data and a second acceleration data. In one example, the first acceleration data may be associated with an acceleration of a vehicle at a first segment of the frame, and the second acceleration data may be associated with an acceleration of the vehicle at a second segment of the frame. In some implementations, the first segment of the frame may be the first (i.e., initial) segment of the frame, and the second segment of the frame may be the last segment of the frame.

The method may include assigning each of the one or more frames to a group by comparing the first acceleration data and the second acceleration data to a predetermined threshold. In some implementations, the assigning of each of the one or more frames to a group may also include comparing a first speed data and a second speed data. In some implementations, the predetermined threshold may be 7 miles per hour per second (mph/s). The predetermined threshold may be a dynamic value that may be updated based on, for example, a driver score, traffic conditions, road conditions, weather conditions, or a combination thereof.

The method may include determining whether the one or more frames is statistically likely to be an adverse behavior. The determining may include analyzing each of the one or more frames by applying one or more machine learning methods. In some implementations, the determining may include, for each of the one or more machine learning methods, determining a preliminary classification for each of the one or more frames. The method may continue by selecting a final classification for each of the one or more frames. The selection of a final classification may be based on a majority of the preliminary classifications for each of the one or more frames. The method may include updating each of the one or more machine learning methods based on the final classification of each of the one or more frames. The method may further include generating a driver score based on the determination.

In some implementations, the method may include displaying a notification. The notification may be based on the driver score, a current velocity of the vehicle, or both. The notification may be an audible, a visual, or a haptic indication to alert the driver to apply a braking mechanism.

In some implementations, the notification may be generated or displayed when a distance threshold between the vehicle and another vehicle is met. The distance threshold may be based on the driver score, the current velocity of the vehicle, or both. In some implementations, the displayed notification may be a navigational route based on the driver score.

In some implementations, when an acceleration during a frame is greater than 7 mph/s, the adverse behavior may be determined as a harsh accelerating (HA) event. In some implementations, when a deceleration during a frame is greater than 7 mph/s, the adverse behavior may be determined as a harsh braking (HB) event. In some implementations, when an acceleration and a deceleration during a frame is less than 7 mph/s, the frame may be determined as a clean frame. In these implementations, 7 mph/s is used merely as an example; the threshold may be greater than 7 mph/s in some implementations, and it may be less than 7 mph/s in other implementations.

In some implementations, each frame of the one or more frames may include a first velocity data and a second velocity data. In one example, the first velocity data may be associated with a velocity of a vehicle at a first segment of the frame, and the second velocity data may be associated with a velocity of the vehicle at a second segment of the frame. In some implementations, the first segment of the frame may be the first (i.e., initial) segment of the frame, and the second segment of the frame may be the last segment of the frame. The method may include assigning each of the one or more frames to a group by comparing the first velocity data and the second velocity data to a predetermined threshold.

A vehicle communication system may be configured to generate and display a notification based on a driver score. The vehicle communication system may include a telematic control unit (TCU). The TCU may include a communication unit that is configured to receive data from a plurality of sensors. The TCU may include a processor that is configured to collect data at a predetermined interval. The data collected by the processor may be data that includes one or more frames. Each frame of the one or more frames may correspond to the predetermined interval and may be divided into segments. For example, each frame may be of five seconds' duration, with five segments of one second each. Each frame may include a first acceleration data and a second acceleration data. In one example, the first acceleration data may be associated with an acceleration of a vehicle at a first segment of the frame, and the second acceleration data may be associated with an acceleration of the vehicle at a second segment of the frame. In some implementations, the first segment of the frame may be the first (i.e., initial) segment of the frame, and the second segment of the frame may be the last segment of the frame.

The processor may be configured to assign each of the one or more frames to a group. The one or more groups may be assigned by comparing the first acceleration data and the second acceleration data to a predetermined threshold. In some implementations, the predetermined threshold may be 7 miles per hour per second (mph/s). The predetermined threshold may be a dynamic value that may be updated based on, for example, a driver score, traffic conditions, road conditions, weather conditions, or a combination thereof.

The processor may be configured to determine whether each of the one or more frames is statistically likely to be an adverse behavior. The processor may be configured to analyze each of the one or more frames by applying one or more machine learning methods. In some implementations, for each of the one or more machine learning methods, the processor may determine a preliminary classification for each of the one or more frames. The processor may select a final classification for each of the one or more frames. The selection of a final classification may be based on a majority of the preliminary classifications for each of the one or more frames. The processor may update each of the one or more machine learning methods based on the final classification of each of the one or more frames. The processor may be further configured to generate a driver score based on the determination.

In some implementations, a display may be configured to display a notification. The processor may be configured to generate the notification based on the driver score, a current velocity of the vehicle, or both. The notification may be an audible, a visual, or a haptic indication to alert the driver to apply a braking mechanism. In an example where the notification is a visual notification, a graphics controller may generate the visual notification based on the notification information received from the processor. The graphics controller may transmit the visual notification to the display to cause the display to display the notification. The display may be configured to display the notification as an indication to apply a braking mechanism. In some implementations, the display may be configured to display the notification as a navigational route based on the driver score.

In some implementations, the processor may generate the notification when a distance threshold between the vehicle and another vehicle is met. The distance threshold may be based on the driver score, the current velocity of the vehicle, or both. In some implementations, the displayed notification may be a navigational route based on the driver score.

In some implementations, when an acceleration during a frame is greater than 7 mph/s, the processor may determine that the adverse behavior is an HA event. In some implementations, when a deceleration during a frame is greater than 7 mph/s, the processor may determine that the adverse behavior is an HB event. In some implementations, when an acceleration and a deceleration during a frame is less than 7 mph/s, the processor may determine that the frame is a clean frame. In these implementations, 7 mph/s is used merely as an example; the threshold may be greater than 7 mph/s in some implementations, and it may be less than 7 mph/s in other implementations.

Variations in these and other aspects, features, elements, implementations, and embodiments of the methods, apparatuses, procedures, and algorithms disclosed herein are described in further detail hereinafter.

BRIEF DESCRIPTION OF THE DRAWINGS

The various aspects of the methods and apparatuses disclosed herein will become more apparent by referring to the examples provided in the following description and drawings in which:

FIG. 3 is a diagram of an example of a frame for use in a vehicle communication system configured to classify driver behavior in accordance with this disclosure;

DETAILED DESCRIPTION

Figure 1:
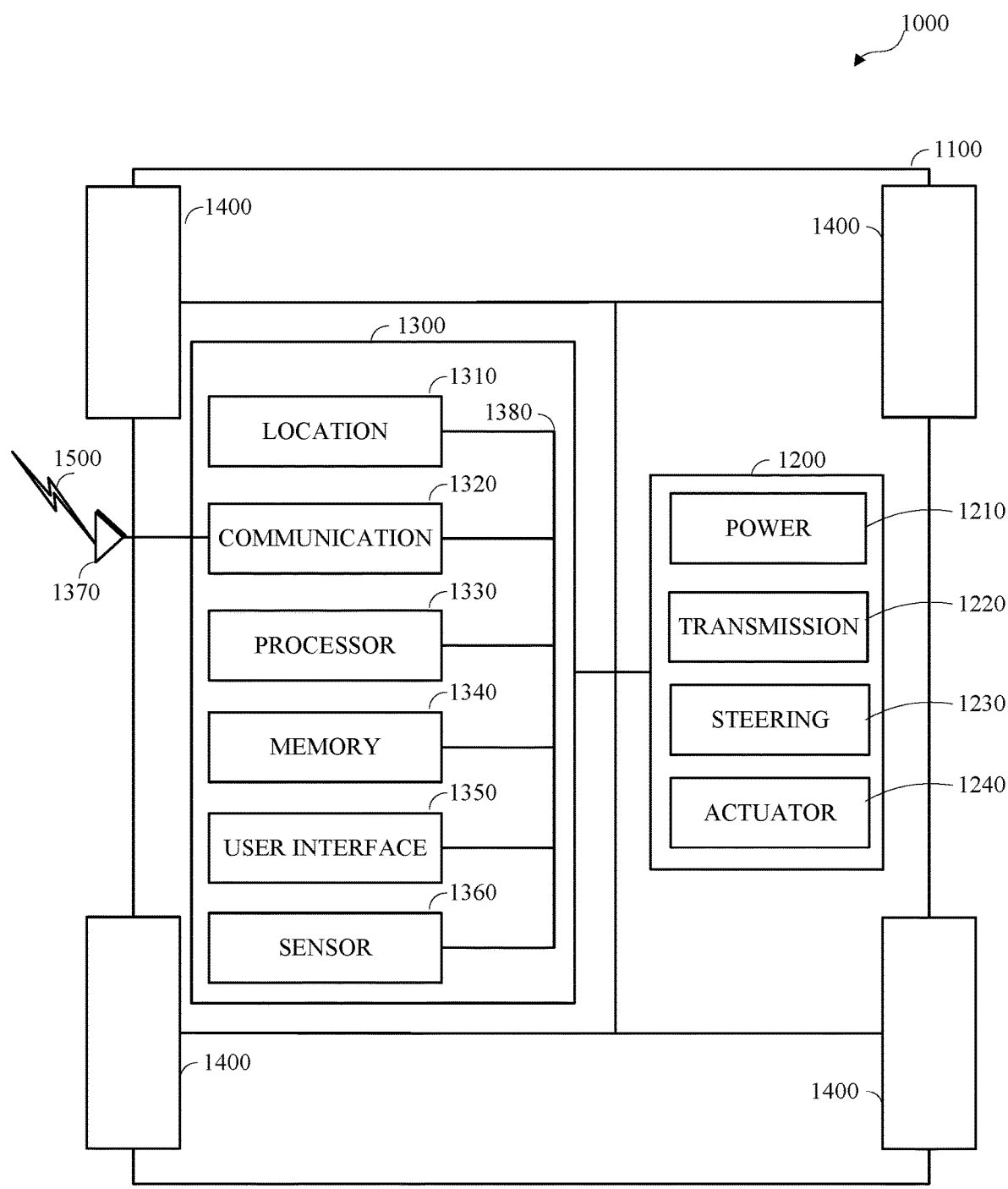
FIG. 1 is a diagram of an example of a vehicle in which the aspects, features, and elements disclosed herein may be implemented.

A vehicle may include one or more sensors for generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, a vehicle transportation network geometry, or a combination thereof.

As used herein, the terminology "computer" or "computing device" includes any unit, or combination of units, capable of performing any method, or any portion or portions thereof, disclosed herein.

As used herein, the terminology "processor" indicates one or more processors, such as one or more special-purpose processors, one or more digital signal processors, one or more microprocessors, one or more controllers, one or more microcontrollers, one or more application processors, one or more Application Specific Integrated Circuits, one or more Application Specific Standard Products, one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random-access memories (RAM), one or more registers, one or more low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special-purpose processor, or circuitry, that may include specialized hardware for carrying out any of the methods, algorithms, aspects, or combinations thereof, as described herein. In some implementations, portions of the instructions may be distributed across multiple processors on a single device, or across multiple processors on multiple devices that may communicate directly or across a network, such as a local area network, a wide area network, the Internet, or a combination thereof.

As used herein, the terminology "example," "embodiment," "implementation," "aspect," "feature," or "element" indicates serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle in which the aspects, features, and elements disclosed herein may be implemented. As shown, a vehicle 1000 includes a chassis 1100, a powertrain 1200, a controller 1300, wheels 1400, and may include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals; power, such as electrical power or torque; or both information and power may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), or lithium-ion (Li-ion) batteries; solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

The controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit, and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices, now-existing or hereafter developed, capable of manipulating or processing a signal or other information, including optical processors, quantum processors, molecular processors, or a combination thereof. For example, the processor 1330 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium capable of, for example, containing, storing, communicating, or transporting machine readable instructions, or any information associated therewith, for use by or in connection with the processor 1330. The memory 1340 may be, for example, one or more solid-state drives, one or more memory cards, one or more removable media, one or more read-only memories, one or more random-access memories, one or more disks (including a hard disk, a floppy disk, an optical disk), a magnetic or optical card, or any type of non-transitory media suitable for storing electronic information, or any combination thereof.

The communication interface 1370 may be a wireless antenna (as shown), a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. The communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device (such as an eye-tracking device), a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensors 1360 may include sensors that are operable to obtain information regarding the physical environment surrounding the vehicle 1000. For example, one or more sensors may detect road geometry and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000, a route planned for the vehicle 1000, a driver score, or a combination thereof. A driver score may be dynamic and generated in real time. Based on this information, the trajectory controller may determine and optimize a trajectory for the vehicle 1000. The trajectory controller may output signals operable to control the vehicle 1000 such that the vehicle 1000 follows the trajectory that is determined by the trajectory controller. For example, the output of the trajectory controller may be an optimized route based on the driver score. The optimized route may be optimized for safety such that a driver with a poor driving score would receive a route that has a higher percentage of people with good driving scores, a route that has less traffic, a route that has fewer accidents, or a combination thereof. In another example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
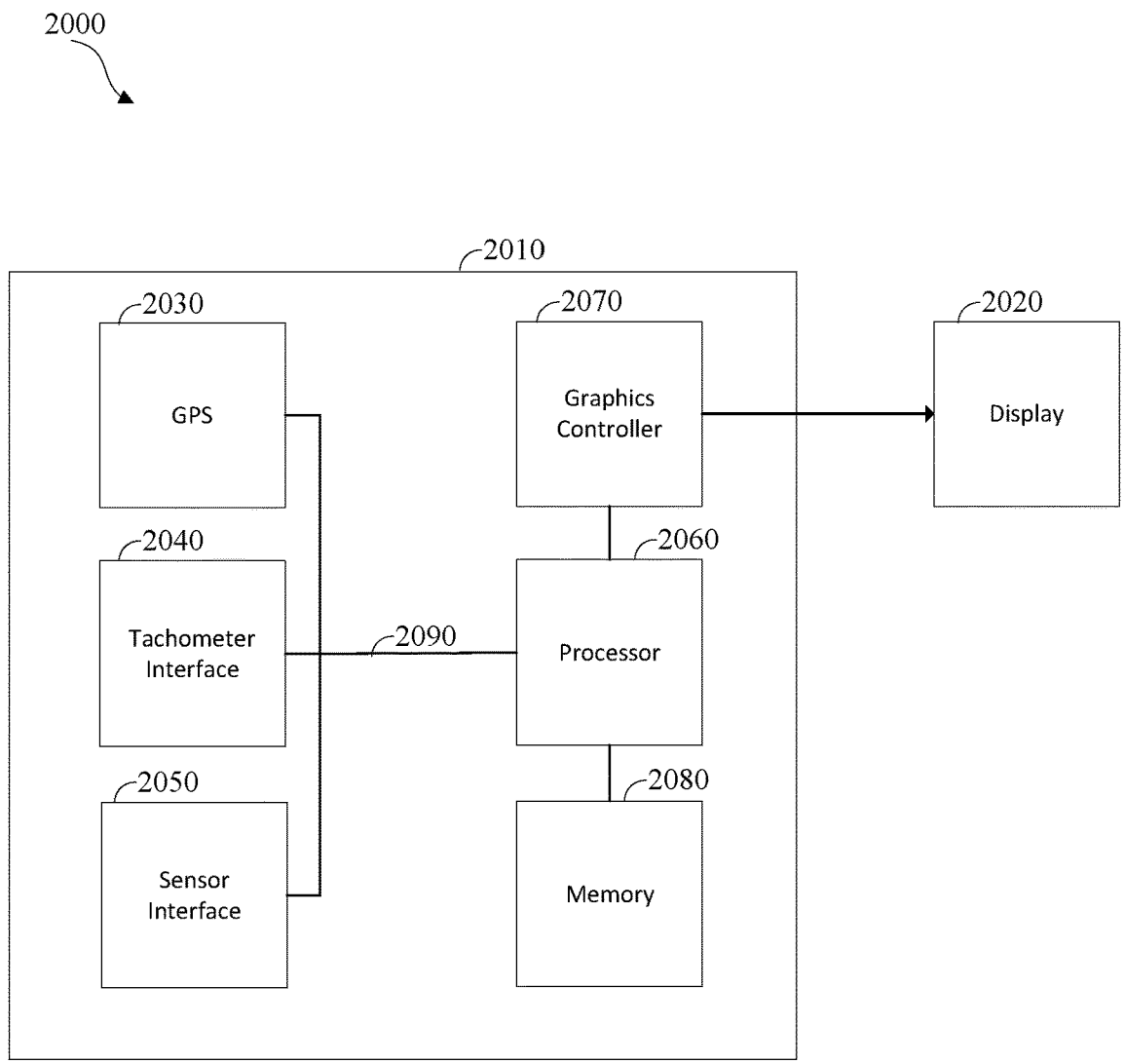
FIG. 2 is a diagram of an example of a portion of a vehicle communication system in which the aspects, features, and elements disclosed herein may be implemented.

FIG. 2 is a diagram of an example of a portion of a vehicle communication system 2000 in which the aspects, features, and elements disclosed herein may be implemented. The portion of the vehicle communication system 2000 shown includes a telematics control unit (TCU) 2010 and a display 2020. As shown in FIG. 2, the TCU 2010 includes a GPS unit 2030, a tachometer interface 2040, a sensor interface 2050, a processor 2060, a graphics controller 2070, and a memory 2080.

The GPS unit 2030 may determine geolocation information, such as longitude, latitude, elevation, direction of travel, or speed, of the vehicle 1000 in FIG. 1. For example, the GPS unit 2030 may include a WAAS enabled NMEA unit, a radio triangulation unit, or a combination thereof. The GPS unit 2030 can be used to obtain information that represents, for example, a current heading of the vehicle 1000, a current position of the vehicle 1000 in two or three dimensions, a current angular orientation of the vehicle 1000, or a combination thereof. In some implementations, the GPS unit 2030 may be an interface that is in communication with the location unit 1310 and receives the information from the location unit 1310 via a wired or wireless communication link.

The tachometer interface 2040 is configured to receive speed information from a speedometer of the vehicle 1000 in FIG. 1. The speed information may include a measurement of distance covered per unit of time, for example, an instantaneous speed of the vehicle 1000 in FIG. 1 at any instant (or point) in time. The speed information may include an average speed, such as the total distance covered by the vehicle 1000 of FIG. 1 divided by a time interval. The speed information may include a tangential speed that may be expressed in revolutions per minute (RPM).

The sensor interface 2050 may be configured to communicate with the sensor 1360 in FIG. 1. The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensor interface 2050 may be configured to obtain information regarding the physical environment surrounding the vehicle 1000. For example, one or more sensors may detect road geometry and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the TCU 2010 may be combined.

The processor 2060 is configured to communicate with the GPS unit 2030, the tachometer interface 2040, and the sensor interface 2050 via a system bus 2090. The processor 2060 may be configured to collect data from the GPS unit 2030, the tachometer interface 2040, the sensor interface 2050, or a combination thereof. The processor 2060 may be configured to group the collected data and apply one or more machine learning techniques to determine a primary classification for an event. The processor 2060 may be configured to perform one or more iterative techniques to determine a final classification. For example, an iterative technique may include a majority vote, a random selection, a weighted average, or a combination thereof. The processor 2060 may be configured to determine a driver score based on one or more of the determined classifications.

The processor 2060 is configured to communicate with the graphics controller 2070 and the memory 2080. For example, the processor 2060 may transmit the driver score to the memory 2080 for storage. The memory 2080 may be configured to store the driver score and a history of previous driver scores. The processor 2060 may be configured to generate a notification based on the driver score. The notification may be an audible notification, a visual notification, or a combination thereof. The graphics controller 2070 may be configured to receive the notification, or an indication of the notification, and generate and transmit a graphical representation of the notification for display on the display 2020.

FIG. 3 is a diagram of an example of a frame 3000 for use in a vehicle communication system configured to classify driver behavior in accordance with this disclosure. In this example, the frame 3000 is a five-second frame where the duration of time from $t_1$ to $t_6$ is five seconds. The duration of the frame 3000 is shown as five seconds for illustrative purposes, and it is understood that the duration may be for any unit of time. For example, the duration may be greater than five seconds, or it may be less than five seconds.

As shown in FIG. 3, the frame 3000 comprises five one-second intervals. The one-second duration of time from $t_1$ to $t_2$ is shown as $I_1$, the one-second duration of time from $t_2$ to $t_3$ is shown as $I_2$, the one-second duration of time from $t_3$ to $t_4$ is shown as $I_3$, the one second duration of time from $t_4$ to $t_5$ is shown as $I_4$, and the one-second duration of time from $t_5$ to $t_6$ is shown as $I_5$. In this example, the duration of each interval is shown as one second for illustrative purposes, and it is understood that the duration may be for any unit of time. For example, the duration may be greater than one second, or it may be less than one second.

In order to reduce the amount of data collected, data is collected in this example for only the first interval $I_1$ and the last interval $I_5$ of the frame 3000. As shown in FIG. 3, the data collected in $I_1$ and $I_5$ may include a location, a speed, an acceleration, and a timestamp for each respective interval. Other data may be collected at these intervals, and the location, speed, acceleration, and timestamp are shown merely as examples.

The frame 3000 may be classified for one or more driver behaviors. For example, the frame 3000 may be classified as a harsh acceleration (HA) frame, a harsh braking (HB) frame, a clean (C) frame that is free of any harsh or adverse event, or an HA/HB frame where a harsh acceleration event and a harsh braking event occurred in the frame. Key attributes of each frame 3000 include an initial speed of the frame 3000; a final speed of the frame 3000; an initial acceleration of the frame 3000; a final acceleration of the frame 3000; and the speed at $I_4$, which can be inferred from the speed at $t_5$ and $t_6$.

An analytics-based approach may be used to classify each frame, such as the frame 3000 shown in FIG. 3. The analytics-based approach accommodates for the data that is not collected in each frame without negatively affecting the driver score. Under normal circumstances, HA and HB events may be a small percentage of all events. For example, HA and HB events may be one percent or less of all events. Behavioral-based clustering may be used to group each frame into a variety of clusters. For example, one cluster may be for frames with low initial frame velocities and final velocities. This example cluster may be for drivers that are at a stop sign or a stop signal. Any number of clusters may be generated. Table 1 below shows an example of 16 clusters.

thresholds for each cluster. At operation 4030, a number of machine learning techniques are selected at random and are statistically non-correlated approaches to determine whether each frame is statistically likely to be an adverse behavior. In this example, three machine learning techniques are selected; however, any number of machine learning techniques may be selected. These three selected machine learning techniques are applied to each frame at operation 4040 to determine a primary classification for each frame. At operation 4050, a final classification is selected for each frame. The final classification may be selected based on a majority voting approach or any other suitable selection approach. For example, if two of the three selected machine learning techniques determined that a frame is an HA frame, and one of the three selected machine learning techniques determined that the frame is a clean frame, the majority voting approach would determine that the final classification of the frame is an HA frame. The final classification of the frame may be fed back to train the machine learning

TABLE 1

| Cluster | Condition | First Interval Acceleration Behavior | Last Interval Acceleration Behavior | Additional Conditions |
|---|---|---|---|---|
| 0 | initialspeed = finalspeed | | | |
| 1 | initialspeed < finalspeed | | | |
| 2 | initialspeed > finalspeed | | | |
| 3 | | ≤2 mph/s | >2 mph/s | |
| 4 | | ≤2 mph/s | <−2 mph/s | |
| 5 | finalspeed − initialspeed ≤ −7 | >2 mph/s | ≤2 mph/s | |
| 6 | finalspeed − initialspeed > −7 | | | finalspeed > initialspeed − 7 |
| 7 | | >2 mph/s | >2 mph/s | |
| 8 | initialspeed = finalspeed | >2 mph/s | <−2 mph/s | |
| 9 | initialspeed < finalspeed | | | |
| 10 | initialspeed > finalspeed | | | |
| 11 | | <−2 mph/s | ≤2 mph/s | |
| 12 | absolutVal(finalspeed − initialspeed) ≤ 10 | ≤−2 mph/s | >2 mph/s | If speeddiff ≤ 10 |
| 13 | initialspeed < finalspeed, and the above condition (12) does not hold | | | If initialspeed < finalspeed |
| 14 | initialspeed > finalspeed, and the above condition (12) does not hold | | | |
| 15 | | ≤−2 mph/s | ≤−2 mph/s | |

Table 1 above shows an example of clustering based on driver behavior. In this example, 16 clusters are formed; however, the number of clusters is not fixed. More or fewer clusters may be formed based on the collected data.

Figure 4:
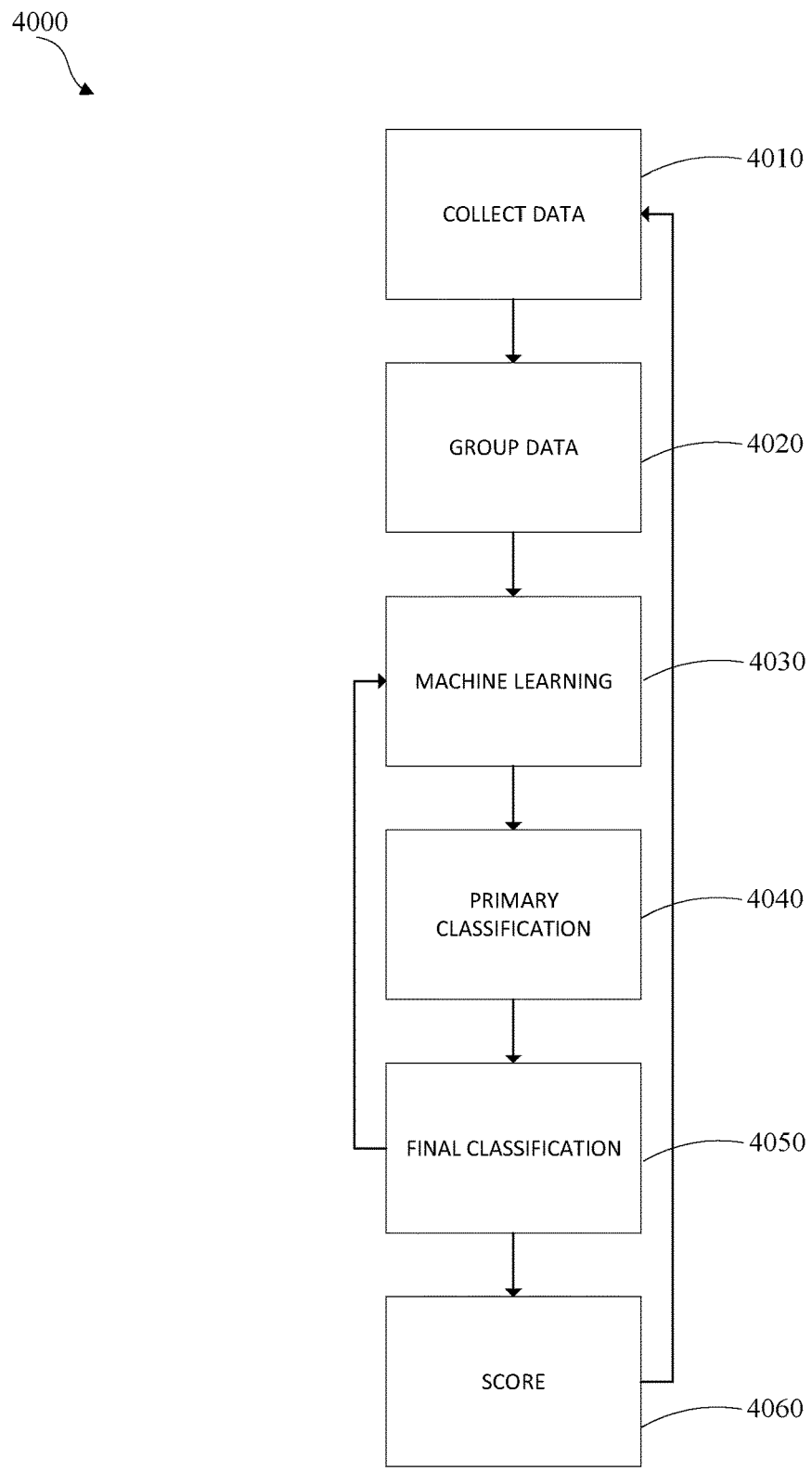
FIG. 4 is a flow diagram of an example of a method for use in a vehicle communication system configured to classify driver behavior in accordance with embodiments of this disclosure.

FIG. 4 is a flow diagram of an example of a method 4000 for use in a vehicle communication system configured to classify driver behavior in accordance with embodiments of this disclosure. The method 4000 is an example of an ensemble machine learning approach. In this approach, all the frames may initially be classified as clean frames. In addition, the method 4000 may train a large number of machine learning techniques, for example, Gradient Descent, Support Vector Machines, Random Forests, Decision Tree, Logistic Regression, or a combination thereof.

Referring to FIG. 4, data is collected at a predetermined interval at operation 4010. For example, the data may be collected in five-second frames, such as the frame 3000 in FIG. 3. Each frame contains a plurality of intervals, where data is collected for the first interval and the last interval. The data collected may include values for a location, a speed, an acceleration, and a timestamp for each respective interval. The data is then assigned to a group at operation 4020 according to a clustering model, such as the one shown in Table 1. The clustering model may include predetermined techniques so that they adapt and learn over time. Once the final classification is determined for each frame at operation 4050, a driver score is determined at operation 4060 based on the final classification of each frame.

Figure 5:
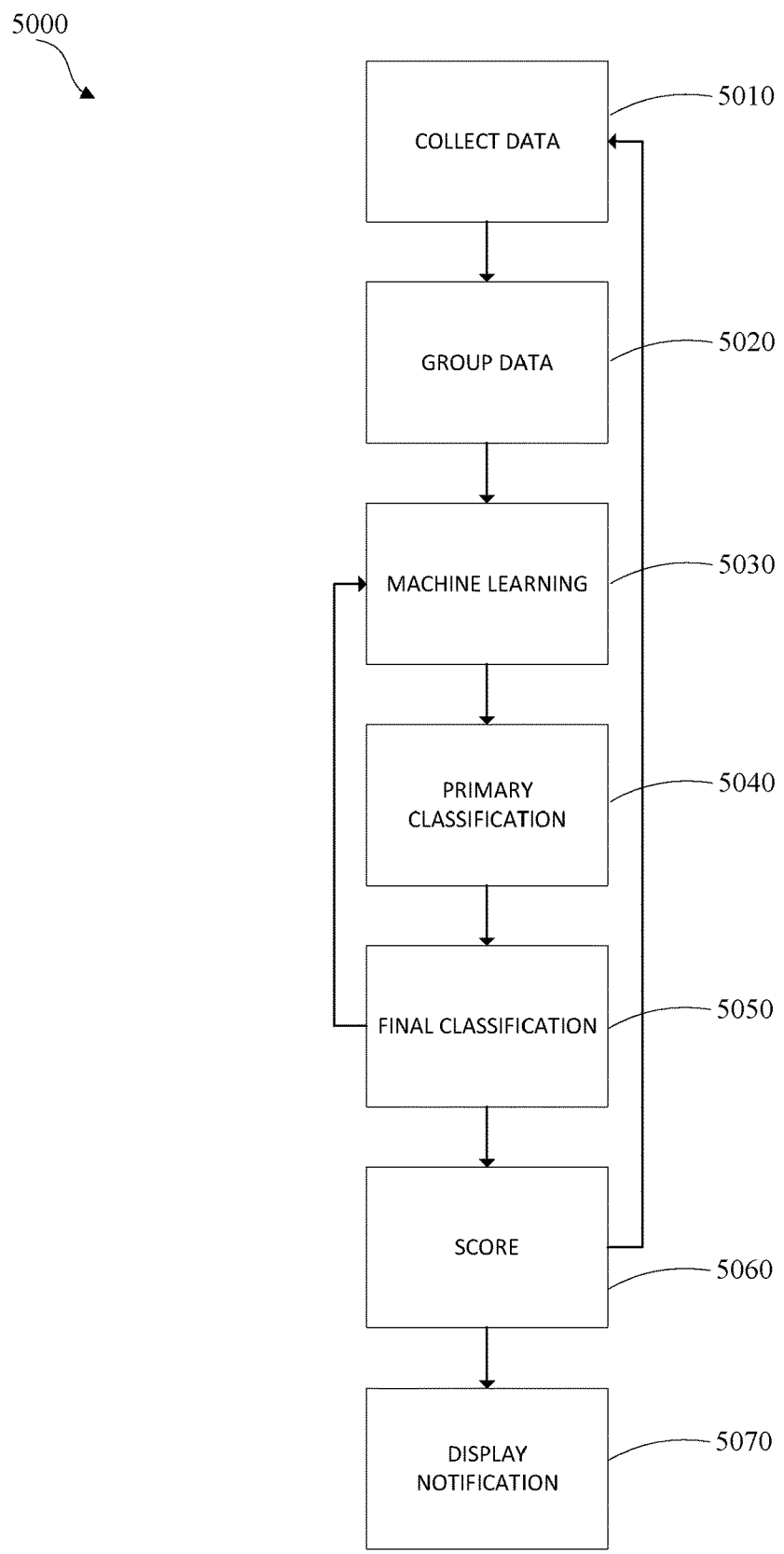
FIG. 5 is a flow diagram of an example of another method for use in a vehicle communication system configured to classify driver behavior in accordance with embodiments of this disclosure.

FIG. 5 is a flow diagram of an example of another method for use in a vehicle communication system configured to classify driver behavior in accordance with embodiments of this disclosure. The method 5000 is an example of an ensemble machine learning approach. In this approach, all the frames may initially be classified as clean frames. In addition, the method 5000 may train a large number of machine learning techniques, for example, Gradient Descent, Support Vector Machines, Random Forests, Decision Tree, Logistic Regression, or a combination thereof.

Referring to FIG. 5, data is collected at a predetermined interval at operation 5010. For example, the data may be collected in five-second frames, such as the frame 3000 in FIG. 3. Each frame contains a plurality of intervals, where data is collected for the first interval and the last interval. The data collected may include values for a location, a speed, an acceleration, and a timestamp for each respective interval. The data is then assigned to a group at operation 5020 according to a clustering model, such as the one shown in Table 1. The clustering model may include predetermined thresholds for each cluster. At operation 5030, a number of machine learning techniques are selected at random and are statistically non-correlated approaches to determine whether each frame is statistically likely to be an adverse behavior. In this example, three machine learning techniques are selected; however, any number of machine learning techniques may be selected. These three selected machine learning techniques are applied to each frame at operation 5040 to determine a primary classification for each frame. At operation 5050, a final classification is selected for each frame. The final classification may be selected based on a majority voting approach or any other suitable selection approach. For example, if two of the three selected machine learning techniques determined that a frame is an HA frame, and one of the three selected machine learning techniques determined that the frame is a clean frame, the majority voting approach would determine that the final classification of the frame is an HA frame. The final classification of the frame may be fed back to train the machine learning techniques so that they adapt and learn over time. Once the final classification is determined for each frame at operation 5050, a driver score is determined at operation 5060 based on the final classification of each frame. The score determined at operation 5060 may be used to generate and display a notification at operation 5070. Although the notification in this example is a visual notification, the notification may be an audible notification, a haptic notification, or a combination thereof.

An ensemble machine learning approach with velocity-based initial prediction may be used. In this example approach, a portion of the frames may be classified as clean, and the remaining frames may be classified as either HA or HB. A threshold may be determined based on the HA value, the HB value, or both. For example, if the HA value is 7 mph/s, the system may determine that the frames that have a final frame velocity minus initial frame velocity greater than 20 mph/s will have the initial frame defined as HA rather than clean. This approach may increase the chances of correct classification. The remaining operations of this approach may be the same as the ensemble machine learning approach examples shown in FIG. 4 and FIG. 5.

Figure 6:
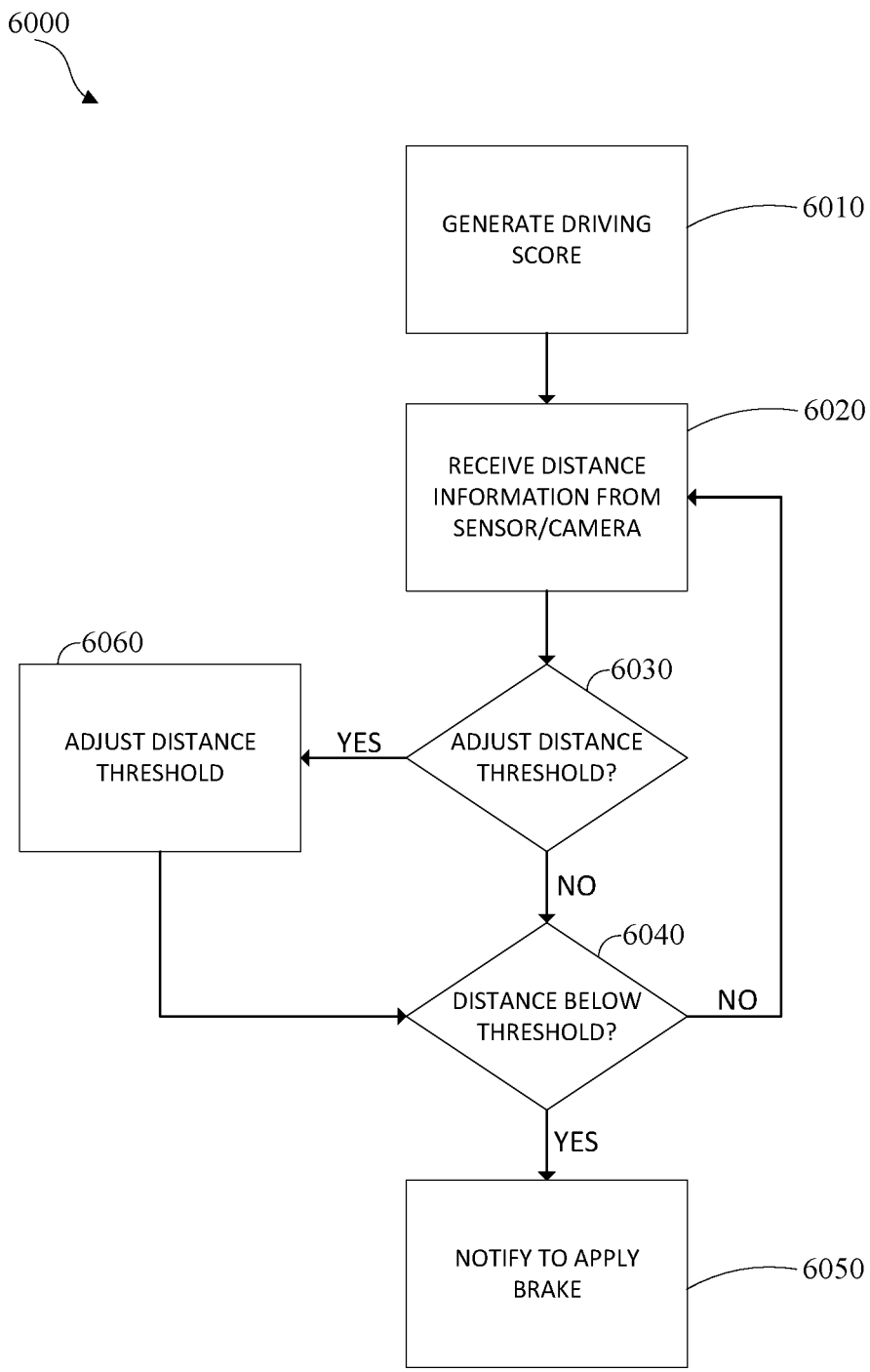
FIG. 6 is a flow diagram of an example of a method for use in a vehicle communication system to provide a display based on a dynamic driving score in accordance with embodiments of this disclosure.

FIG. 6 is a flow diagram of an example of a method 6000 for use in a vehicle communication system to provide a display based on a dynamic driving score in accordance with embodiments of this disclosure. In this example, the dynamic driving score may be used to enable drivers to make safer decisions. For example, if the vehicle communication system determines that the vehicle in front of the present vehicle is below the threshold for the driving score, the vehicle communication system will notify the driver to apply the brake. If the driving score is poor, the distance threshold may be increased, whereas if the driving score is good for the same driving situation, the distance threshold may be decreased.

Referring to FIG. 6, a driving score is generated at operation 6010. The driving score may be generated using any of the methods shown in FIG. 4 or FIG. 5. In this example, distance information is received from a sensor, a camera, or both at operation 6020. The distance information may include a distance between the vehicle and an adjacent vehicle, for example, a vehicle in front of the vehicle 1000 in FIG. 1. Based on one or more of the received distance information, the driving score, and a current vehicle speed, a determination is made at operation 6030 on whether a distance threshold should be adjusted. If a distance threshold does not need an adjustment, the received distance information is compared to the distance threshold at operation 6040. If it is determined that the distance information is below the threshold, a notification to apply the brake is generated at operation 6050. The notification may be an audible notification, a visual notification, a haptic notification, or a combination thereof.

If it is determined that a distance threshold needs an adjustment at operation 6030, the distance threshold is adjusted at operation 6060 based on one or more of the received distance information, the driving score, and the current vehicle speed. The received distance information is compared to the adjusted distance threshold at operation 6040. If it is determined that the distance information is below the threshold, a notification to apply the brake is generated at operation 6050. The notification may be an audible notification, a visual notification, a haptic notification, or a combination thereof.

Figure 7:
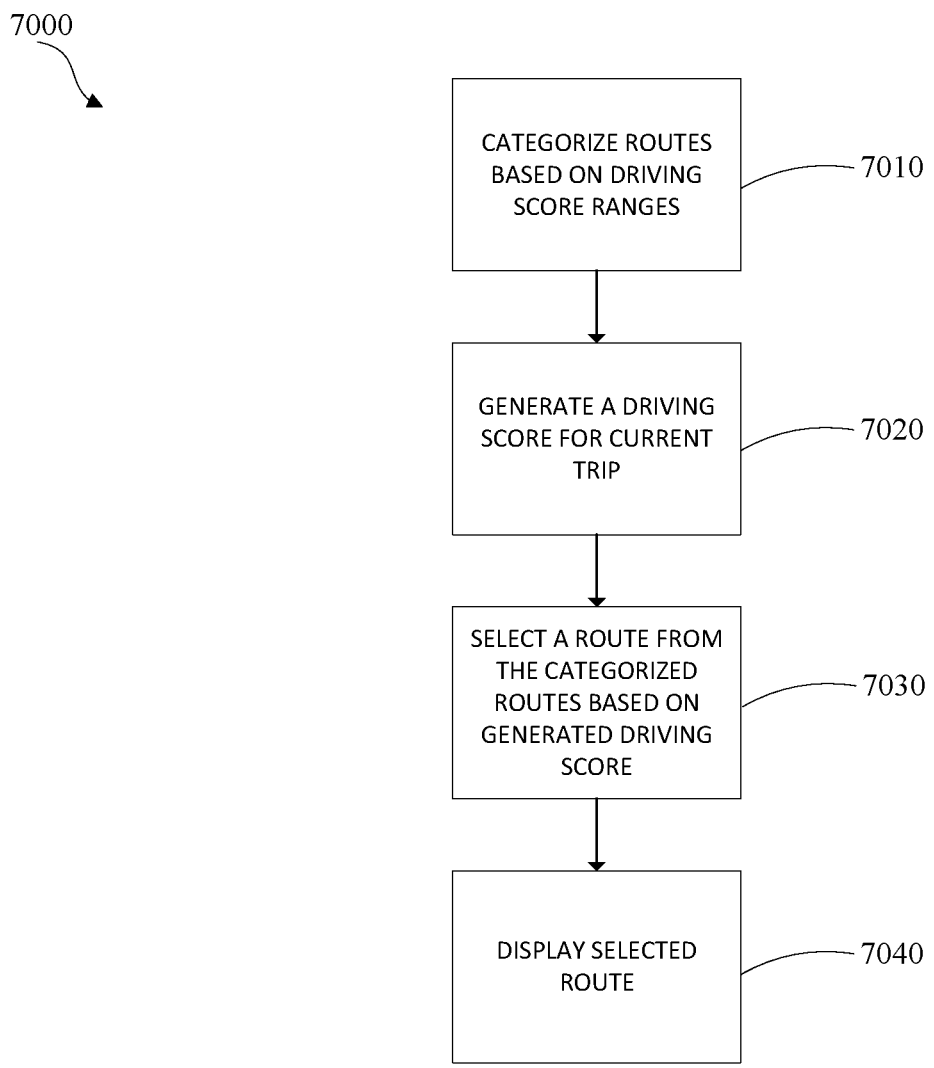
FIG. 7 is a flow diagram of an example of another method for use in a vehicle communication system to provide a display based on a dynamic driving score in accordance with embodiments of this disclosure.

FIG. 7 is a flow diagram of an example of another method 7000 for use in a vehicle communication system to provide a display based on a dynamic driving score in accordance with embodiments of this disclosure. In this example, the dynamic driving score may be used to enable in-vehicle notifications of safer routes for the driver to reach his or her destination. Based on the driving score, the vehicle communication system may provide a notification of which routes are safer with minimal compromise to travel time. For example, if the driver has a poor driving score, the vehicle communication system may recommend routes that have a higher percentage of drivers with good driving scores, routes with less traffic, routes with fewer records of accidents, or a combination thereof.

Referring to FIG. 7, a number of routes may be categorized based on driving score ranges at operation 7010. At operation 7020, a driving score is generated for the current trip. The driving score may include historical driving score data for a particular driver. A route is then selected from the categorized routes based on the generated driving score at operation 7030. At operation 7040, the selected route is then displayed on a display, such as the user interface 1350 in FIG. 1 or the display 2020 in FIG. 2.

For the clustering methods disclosed herein, additional factors may be considered when grouping each frame to a particular cluster. For example, driver behavior—based reaction times may be considered. Key behavior rules may be used for interpolation when considering driver behavior—based reaction times.

For example, a driver reaction time from acceleration to braking or from braking to acceleration may be approximately 2 seconds. These actions may involve mental processing time, such as sensation, perception, situational awareness, response selection, and programming. These actions may also involve movement time, for example, the time it takes the driver to perform the required physical movements to accelerate or brake the vehicle. These actions may also include device response time, for example, the time it takes a mechanical device, such as the vehicle, to engage.

A driver behavior—based acceleration-velocity relationship may be considered when grouping each frame to a particular cluster. For example, acceleration may linearly decrease with velocity. Some implementations may use a model a=alpha−(beta*velocity), where alpha is approximately 1.7 m/s and beta is approximately 0.04 m/s for acceleration, and where alpha is approximately 3.2 m/s and beta is approximately 0.165 m/s for deceleration. This model may vary based on the type of vehicle.

Example clustering behavior rules are shown in Tables 2A, 2B, and 2C below. The example behavior-based clusters (BBC)s shown in Tables 2A, 2B, and 2C are for an HA threshold of 7 mph/s and an HB threshold of −7 mph/s. The rules for each BBC may be modified if the HA threshold, HB threshold, or a combination of both thresholds are different from 7 mph/s to obtain a more optimal clustering. In the examples shown in Tables 2A, 2B, and 2C, the attributes for each cluster include the following parameters: (1) first interval acceleration, (2) final interval acceleration, (3) first interval speed, and (4) final interval speed.

TABLE 2A

| Behavior Based Cluster (BBC) | Cluster | First Interval Behavior | Fifth Interval Behavior | Additional Condition |
|---|---|---|---|---|
| 0 | 0 | Doing nothing | Doing nothing | initialspeed = finalspeed |
|   | 1 | Doing nothing | Doing nothing | initialspeed < finalspeed |
|   | 2 | Doing nothing | Doing nothing | initialspeed > finalspeed |
| 1 | 3 | Doing nothing | Gas pedal (accelerating) | |
| 2 | 4 | Doing nothing | Brake pedal (decelerating) | |
| 3 | 5 | Gas pedal (accelerating) | Doing nothing | finalspeed − initialspeed ≤ −7 |
|   | 6 | Gas pedal (accelerating) | Doing nothing | finalspeed − initialspeed > −7 |
| 4 | 7 | Gas pedal (accelerating) | Gas pedal (accelerating) | |
| 5 | 8 | Gas pedal (accelerating) | Brake pedal (decelerating) | initialspeed = finalspeed |
|   | 9 | Gas pedal (accelerating) | Brake pedal (decelerating) | initialspeed < finalspeed |
|   | 10 | Gas pedal (accelerating) | Brake pedal (decelerating) | initialspeed > finalspeed |
| 6 | 11 | Brake pedal (decelerating) | Doing nothing | |
| 7 | 12 | Brake pedal (decelerating) | Gas pedal (accelerating) | absolutVal(finalspeed − initialspeed) ≤ 10 |
|   | 13 | Brake pedal (decelerating) | Gas pedal (accelerating) | initialspeed < finalspeed, and the above condition does not hold |
|   | 14 | Brake pedal (decelerating) | Gas pedal (accelerating) | initialspeed > finalspeed, and the above condition (12) does not hold |
| 8 | 15 | Brake pedal (decelerating) | Brake pedal (decelerating) | |

TABLE 2B

| Behavior Based Cluster (BBC) | Cluster | First Interval Acceleration Behavior | Last Interval Acceleration Behavior | Additional Condition |
|---|---|---|---|---|
| 0 | 0 | ≤2 mph/s, ≥−2 mph/s | ≤2 mph/s, ≥−2 mph/s | |
|   | 1 | ≤2 mph/s, ≥−2 mph/s | ≤2 mph/s, ≥−2 mph/s | |
|   | 2 | ≤2 mph/s, ≥−2 mph/s | ≤2 mph/s, ≥−2 mph/s | |
| 1 | 3 | ≤2 mph/s, ≥−2 mph/s | >2 mph/s | |
| 2 | 4 | ≤2 mph/s, ≥−2 mph/s | <−2 mph/s | |
| 3 | 5 | >2 mph/s | ≤2 mph/s, ≥−2 mph/s | finalspeed − initialspeed ≤ −7 |
|   | 6 | >2 mph/s | ≤2 mph/s, ≥−2 mph/s | finalspeed − initialspeed > −7 |
| 4 | 7 | >2 mph/s | >2 mph/s | |
| 5 | 8 | >2 mph/s | <−2 mph/s | |
|   | 9 | >2 mph/s | <−2 mph/s | |
|   | 10 | >2 mph/s | <−2 mph/s | |
| 6 | 11 | <−2 mph/s | ≤2 mph/s, ≥−2 mph/s | |
| 7 | 12 | <−2 mph/s | >2 mph/s | If speeddiff ≤ 10 |
|   | 13 | <−2 mph/s | >2 mph/s | If initialspeed < finalspeed |
|   | 14 | <−2 mph/s | >2 mph/s | |
| 8 | 15 | <−2 mph/s | <−2 mph/s | |

TABLE 2C

| Behavior Based Cluster (BBC) | Cluster | First Interval Speed | Last Interval Speed | Additional Condition |
|---|---|---|---|---|
| 0 | 0 | Same | Same | |
|   | 1 | Slow | Fast | |
|   | 2 | Fast | Slow | |
| 1 | 3 | | | |
| 2 | 4 | | | |
| 3 | 5 | 0 to 10 mph | 0 to 10 mph | finalspeed − initialspeed ≤ −7 |
|   | 6 | >10 mph | >10 mph | finalspeed − initialspeed > −7 |
| 4 | 7 | | | |
| 5 | 8 | Same | Same | |
|   | 9 | Slow | Fast | |
|   | 10 | Fast | Slow | |
| 6 | 11 | | | |
| 7 | 12 | Same | Same | If speeddiff ≤ 10 |
|   | 13 | Slow | Fast | If initialspeed < finalspeed |
|   | 14 | Fast | Slow | |
| 8 | 15 | | | |

For the purposes of this disclosure, a "gas pedal" and "brake pedal" include any type of control used to accelerate or decelerate a vehicle, for example, foot pedals and hand controls. Tables 2A, 2B, and 2C above show 9 example BBCs. In these examples, "doing nothing" is defined as when the driver is neither applying the gas pedal nor applying the brake pedal.

For example, BBC 0 may be categorized as frames where the driver is doing nothing in the first interval and the fifth interval. BBC 0 may include clusters 0, 1, and 2. The rationale for cluster 0 may be to find segments where the vehicle is completely stationary or when cruise-control is engaged. The rationale for cluster 1 may be that the vehicle must have moved, and an acceleration event must have occurred at some point. The rationale for cluster 2 may be that the vehicle must have moved, and a braking event must have occurred at some point.

In this example, BBC 1 may be categorized as frames where the driver is doing nothing in the first interval and applying the gas pedal in the fifth interval. BBC 1 may include cluster 3.

BBC 2 may be categorized as frames where the driver is doing nothing in the first interval and applying the brake pedal in the fifth interval. BBC 2 may include cluster 4.

BBC 3 may be categorized as frames where the driver is applying the gas pedal in the first interval and doing nothing in the fifth interval. BBC 3 may include clusters 5 and 6. The rationale for cluster 5 may be that although the vehicle was initially accelerating, its final speed shows that it slowed down significantly. Therefore, an HB event likely occurred within the frame. The rationale for cluster 6 may be that the above does not hold, and therefore an HA or an HB event did not occur within the frame.

BBC 4 may be categorized as frames where the driver is applying the gas pedal in the first interval and the fifth interval. BBC 4 may include cluster 7.

BBC 5 may be categorized as frames where the driver is applying the gas pedal in the first interval and applying the brake pedal in the fifth interval. BBC 5 may include clusters 8, 9, and 10. The rationale for cluster 8 may be that a harsh or adverse event is not likely. The rationale for cluster 9 may be that an HA event is more likely than an HB event. The rationale for cluster 10 may be that an HB event is more likely than an HA event.

BBC 6 may be categorized as frames where the driver is applying the brake pedal in the first interval and doing nothing in the fifth interval. BBC 6 may include cluster 11.

BBC 7 may be categorized as frames where the driver is applying the brake pedal in the first interval and applying the gas pedal in the fifth interval. BBC 7 may include clusters 12, 13, and 14. The rationale for cluster 13 may be that the final acceleration event (i.e., the acceleration in the sixth interval) is an HA event. The rationale for cluster 14 may be that the initial braking event (i.e., the acceleration in the first interval) is an HB event.

BBC 8 may be categorized as frames where the driver is applying the brake pedal in the first interval and the fifth interval. BBC 8 may include cluster 15.

Referring to Table 2C, a frame that has a first interval speed that is lower than the last interval speed may be characterized as slow-fast. Accordingly, the final speed of the frame is higher than the initial speed of the frame, which is indicative of an acceleration behavior. A frame that has a first interval speed that is higher than the last interval speed may be characterized as fast-slow. Accordingly, the final speed of the frame would be lower than the initial speed of the frame, which is indicative of a deceleration behavior. A frame that has a first interval speed that is comparable to the last interval speed may be characterized as same-same. This frame is indicative of a steady speed behavior.

One objective of the clustering may be to determine two dominant behaviors in the frames in each cluster (e.g., clean and HA, clean and HB, etc.) to increase the accuracy of predicting the actual behavior (i.e., clean, HA, or HB) in each frame. Example clustering behavior results are shown in Table 3 below.

TABLE 3

| Cluster | Total | Clean | HA | HB | HA and HB |
|---|---|---|---|---|---|
| 0 | 118012 | 118011 | 0 | 1 | 0 |
| 1 | 100264 | 100170 | 94 | 0 | 0 |
| 2 | 93166 | 93063 | 0 | 103 | 0 |
| 3 | 18484 | 18077 | 393 | 14 | 0 |
| 4 | 22245 | 21744 | 8 | 493 | 0 |
| 5 | 172 | 157 | 3 | 12 | 0 |
| 6 | 21521 | 21338 | 182 | 1 | 0 |
| 7 | 7166 | 6991 | 175 | 0 | 0 |
| 8 | 67 | 66 | 1 | 0 | 0 |
| 9 | 449 | 436 | 13 | 0 | 0 |
| 10 | 1337 | 1283 | 12 | 42 | 0 |
| 11 | 18909 | 18348 | 6 | 554 | 1 |
| 12 | 4028 | 3878 | 17 | 131 | 2 |
| 13 | 861 | 813 | 30 | 17 | 1 |
| 14 | 191 | 150 | 0 | 41 | 0 |
| 15 | 6752 | 6446 | 1 | 305 | 0 |

As shown in Table 3 above, each cluster may be divided primarily into two classification categories, thereby simplifying the determination of the correct classification for each frame. The two classification categories may be referred to as dominant behaviors, and are shown in bold for each cluster in Table 3 above. Machine learning methods may be applied to the two primary categories to determine the classification for each frame.

Tables 2A, 2B, 2C, and 3 above, may be used to determine the two dominant behaviors for each cluster. As shown in Table 3, clusters 1, 3, 6-9, and 13 may be classified as having dominant behaviors of clean and HA, and clusters 0, 2, 4, 5, 10-12, 14, and 15 may be classified as having dominant behaviors of clean and HB. For example, based on the speed conditions in Table 2C, and using the data in Table 3, the two dominant behaviors for cluster 6 may be determined as clean and HA. Similarly, it may be determined that the dominant conditions for cluster 5 are clean and HB.

The above-described aspects, examples, and implementations have been described in order to facilitate easy understanding of the disclosure and are not limiting. On the contrary, the disclosure covers various modifications and equivalent arrangements included within the scope of the appended claims, which scope is to be accorded the broadest interpretation as is permitted under the law so as to encompass all such modifications and equivalent arrangements.

What is claimed is:

1. A method for use in a vehicle, the method comprising:
collecting data at a predetermined interval, wherein the data includes a plurality of frames and each frame of the plurality of frames corresponds to the predetermined interval and includes a first acceleration data and a second acceleration data;
assigning each of the plurality of frames to a group by comparing the first acceleration data and the second acceleration data to a predetermined threshold;
determining whether each of the plurality of frames is statistically likely to be an adverse behavior, wherein the determining includes:
analyzing each of the plurality of frames using a plurality of machine learning methods;
determining, for each of the plurality of machine learning methods, a preliminary classification for each of the plurality of frames; and
selecting a final classification for each of the plurality of frames based on a majority of the preliminary classifications for each of the plurality of frames; and
generating a driver score based on the determination.

2. The method of claim 1, further comprising:
displaying a notification based on the driver score and a current velocity of the vehicle, wherein the notification is an indication to apply a braking mechanism.

3. The method of claim 2, wherein the notification is displayed on a condition that a distance threshold between the vehicle and another vehicle is met, wherein the distance threshold is based on the driver score and the current velocity of the vehicle.

4. The method of claim 1, further comprising:
displaying a navigational route based on the driver score.

5. The method of claim 1, further comprising:
updating each of the plurality of machine learning methods based on the final classification of each of the plurality of frames.

6. The method of claim 1, wherein on a condition that an acceleration during a frame is greater than a threshold, the adverse behavior is determined as a harsh accelerating (HA) event.

7. The method of claim 1, wherein on a condition that a deceleration during a frame is greater than a threshold, the adverse behavior is determined as a harsh braking (HB) event.

8. The method of claim 1, wherein on a condition that an acceleration and a deceleration during a frame is less than a threshold, the frame is determined as a clean frame.

9. The method of claim 1, wherein each frame of the plurality of frames further includes a first velocity data and a second velocity data, the method further comprising:
assigning each of the plurality of frames to a group by comparing the first velocity data and the second velocity data to a predetermined threshold.

10. A method for use in a vehicle, the method comprising:
collecting data at a predetermined interval, wherein the data includes a plurality of frames and each frame of the plurality of frames corresponds to the predetermined interval and includes a first acceleration data and a second acceleration data;
assigning each of the plurality of frames to a group by comparing the first acceleration data and the second acceleration data to a predetermined threshold;
determining whether each of the plurality of frames is statistically likely to be an adverse behavior by:
analyzing each of the plurality of frames using a plurality of machine learning methods;
determining, for each of the plurality of machine learning methods, a preliminary classification for each of the plurality of frames; and
selecting a final classification for each of the plurality of frames based on a majority of the preliminary classifications for each of the plurality of frames;
generating a driver score based on the determination; and
displaying a notification based on the driver score and a current velocity of the vehicle.

11. The method of claim 10, wherein the notification is an indication to apply a braking mechanism.

12. The method of claim 10, wherein the notification is a navigational route based on the driver score.

13. The method of claim 10, further comprising:
updating each of the plurality of machine learning methods based on the final classification of each of the plurality of frames.

14. The method of claim 10, wherein the predetermined threshold is 7 mph/s and on a condition that an acceleration during a frame is greater than the predetermined threshold, the adverse behavior is determined as a harsh accelerating (HA) event.

15. The method of claim 10, wherein the predetermined threshold is 7 mph/s and on a condition that a deceleration during a frame is greater than the predetermined threshold, the adverse behavior is determined as a harsh braking (HB) event.

16. The method of claim 10, wherein the predetermined threshold is 7 mph/s and on a condition that an acceleration and a deceleration during a frame is less than the predetermined threshold, the frame is determined as a clean frame.

17. A vehicle communication system comprising:
a telematic control unit (TCU) comprising:
a communication unit configured to receive data from a plurality of sensors; and
a processor configured to collect data at a predetermined interval, wherein the data includes a plurality of frames and each frame of the plurality of frames corresponds to the predetermined interval and includes a first acceleration data and a second acceleration data;
the processor configured to assign each of the plurality of frames to a group by comparing the first acceleration data and the second acceleration data to a predetermined threshold;
the processor configured to determine whether each of the plurality of frames is statistically likely to be an adverse behavior, wherein the processor is further configured to:
analyze each of the plurality of frames using a plurality of machine learning methods,
determine, for each of the plurality of machine learning methods, a preliminary classification for each of the plurality of frames, and select a final classification for each of the plurality of frames based on a majority of the preliminary classifications for each of the plurality of frames; and the processor configured to generate a driver score based on the determination; and a display configured to:
receive a notification based on the driver score and a current velocity of the vehicle; and
display the notification.

18. The vehicle communication system of claim 17, wherein the display is configured to display the notification as an indication to apply a braking mechanism.

19. The vehicle communication system of claim 17, wherein the display is configured to display the notification as a navigational route based on the driver score.

* * * * *